United States Patent [19]

Patin

[11] Patent Number: 4,974,863
[45] Date of Patent: Dec. 4, 1990

[54] STABILIZATION DEVICE FOR INCLINABLE VEHICLE

[76] Inventor: Pierre Patin, 15 rue Buffon, 75005 Paris, France

[21] Appl. No.: 436,983

[22] Filed: Nov. 15, 1989

[30] Foreign Application Priority Data

Nov. 15, 1988 [FR] France .................. 88 14823

[51] Int. Cl.$^5$ ............................................ B62D 61/06
[52] U.S. Cl. ................................ 280/62; 280/772; 280/112.2
[58] Field of Search ............... 280/62, 772, 112.2; 180/215

[56] References Cited

U.S. PATENT DOCUMENTS

| | | | |
|---|---|---|---|
| 1,688,579 | 10/1928 | Franks | 474/130 |
| 2,152,938 | 4/1939 | Welch | 280/112.2 |
| 2,788,968 | 4/1957 | Kolbe | 280/112.2 |
| 2,954,833 | 10/1960 | Davidson | 280/6.11 |
| 2,960,941 | 11/1960 | Li | 280/112.2 |
| 2,961,254 | 11/1960 | Muller | 280/112.2 |
| 3,781,031 | 12/1973 | Patin | 280/62 |
| 4,003,443 | 1/1977 | Boughers | 280/112.2 |
| 4,921,263 | 5/1990 | Patin | 280/62 |

FOREIGN PATENT DOCUMENTS 0251906 1/1988 European Pat. Off. .

Primary Examiner—Kenneth R. Rice
Attorney, Agent, or Firm—Pollock, Vande Sande & Priddy

[57] ABSTRACT

The device comprises a secondary part (II) mounted rotatable upon the primary part (I), a suspension system with a parallelogram, comprising two lateral vertical rods (3a, 3b) parallel to median plane (P1) and two parallel equalizers (2a, 2b) articulated on the primary part (I), and a rotation-multiplying system comprising a cross-bar (8) and two arms (10a, 10b) mounted upon both lateral rods (3a, 3b), each of them finding a support upon the end of the controlling cross-bar (8) opposite to the corresponding lateral rod (3a, 3b).

According to the invention, each transversal arm (10a, 10b) is substituted by a sliding arm or consol (11a, 11b) linked to the corresponding lateral rod (3a, 3b,) by a sliding linkage (13a, 13b) perpendicularly to said rod, said sliding linkage comprising means (12, 18) allowing selective control of locking or unlocking of the sliding arm in relation with the orientations of median planes (P1, P2) of both parts of the vehicle in relation with the apparent vertical.

6 Claims, 3 Drawing Sheets

STABILIZATION DEVICE FOR INCLINABLE VEHICLE

FIELD OF THE INVENTION

This invention relates to a stabilization device for an inclinable vehicle comprising generally a primary part resting upon the ground through at least three wheels —respectively a steering forewheel and two rear wheels constituting a rear wheelset and a secondary part born by the primary part rotatably around a suspension axis parallel to the ground in the median plane of the vehicle.

BACKGROUND

Such vehicles are described for instance in U.S. Pat. Nos. 3.601.213 and 3.781.031 by the same inventor Pierre Patin. The rear wheelset is constituted of two wheels of which the axles are perpendicular to the median plane of the primary part and are preferably mounted so as to incline with the primary part, so that the vehicle which is stable at standstill, due to its three wheels, is used when rolling like a two wheel vehicle able to incline towards inner side of a curve so as to compensate the centrifugal force: in that case, the median plane of the primary part passing by the forewheel and the center of the rear wheelset coincide with the median plane of the secondary part, passing by the suspension axis and the center of gravity, and is inclined in the direction of the apparent vertical, that is to say the resultant of gravity force and centrifugal force.

For a good stability, it is preferable that both wheels of the rear wheelset incline like the forewheel with the primary part, remaining parallel to the median plane, and, in that aim, the rear wheelset is advantageously mounted upon the primary part using a deformable parallelogram comprising two lateral vertical rods parallel to the median plane of the primary part, the ends of which are hinged with two parallel equalizers, articulated upon the primary part, respectively around two axis placed upon one another in the median plane and parallel to the ground, the axles of both rear wheels being solid respectively with said vertical rods perpendicularly to the median plane.

In French Pat. No. 2.600.612 filed June 27, 1986 by same inventor, it has been described a device allowing to increase the stability of the vehicle by lifting the center of gravity in relation with the ground when the vehicle tends to incline, what increases the potential energy and consequently the stability of the vehicle, such an energy increase being impossible without a supply of energy from outside.

In that aim, the device described in French Pat. No. 2.600.612 comprises a rotation-multiplying system which allows, when the primary part inclines by an angle A in relation with the vertical, to induce a rotation of the secondary part by an angle B greater than A, what induces a lifting of the center of gravity of the secondary part in relation with the ground.

According to one of the embodiments described in patent 2.600.612, the rotation-multiplying system comprises a control cross-bar rotatably solid with secondary part and extended transversely towards each side of the median plane of said secondary part, and two transversal arms mounted respectively upon both lateral vertical rods of the parallelogram, transverse to said rods, each of said arms finding a support respectively upon the end of the control cross-bar opposed to the corresponding lateral rod thanks to a sliding linkage.

The working principle of such a system is described accurately in French Pat. No. 2.600.612 and does not need further development. As a rule, when the primary part rotates in relation with the ground, the secondary part is lifted thanks to the rotation of a member such as a rotating suspension arm articulated upon the primary part and bearing said secondary part, that rotation being multiple of the rotation of the median plane of the primary part in relation with the ground. In the overcited patent were described various means allowing that rotation linkage to be effective only when needed, specially at standstill, thanks to a clutching system which can be controlled by the driver and / or by the speed and / or by the inclination in relation with the vertical when at standstill and with the apparent vertical—that is to say the resultant of gravity force and of centrifugal force —when rolling.

The invention relates to a new stabilization device based on the same principle and using as a rule the same features as described in French Pat. No. 2.600.612, the new device being more simple and cheaper than the previous features and increasing reliability and safety of the vehicle.

The invention therefore is tied to the stabilization device previously described in which the rotation-multiplying system comprises a cross-bar solid in rotation with the secondary part and two transversal arms mounted respectively upon both lateral vertical rods of the parallelogram, transversely to said lateral rods and each finding a support, respectively, upon the end of the control cross-bar opposed to the corresponding lateral rod.

According to the invention, each transversal arm may move parallel to itself along the corresponding lateral rod when the median planes of both primary and secondary parts coincide between themselves and with the direction of the apparent vertical, but, if the center of gravity of secondary part moves out of the median plane by the action of gravity and / or external forces, at least one of both transversal arms is made solid with the corresponding lateral rod so as to make effective the rotation-multiplying system in the direction where it induces a lifting of the center of gravity of the secondary part by rotation of said secondary part in relation with primary part, said rotation producing a righting torque which brings back median planes of both primary and secondary parts in the same direction, which is the direction of the apparent vertical.

In that aim, according to the invention, each transversal arm is linked to the corresponding lateral rod through a sliding linkage which allows the movement of the arm along the lateral rod, that arm remaining perpendicular to said rod, said linkage comprising selective means to control locking and unlocking of said arm upon said rod, in relation with the orientation of the median planes of both primary and secondary parts in relation with the apparent vertical.

In a first embodiment of the invention, the sliding linkage between each transversal arm and the corresponding lateral rod comprises four shoes disposed in two pairs on each side, respectively inner side and outer side of the rod, and at two different levels, respectively upper level and lower level, each rod being able to slide with low friction between the corresponding shoes when both transversal arms are in line in middle position with the cross-bar, said shoes being able to be applied upon the opposite sides of the rod, one on each side at different levels, so as to make solid by friction the arm with the corresponding rod when said arm is discarded from its position by the cross-bar as the result of a movement of the centre of gravity of the secondary part in relation with the median plane of the primary part.

In another embodiment, each sliding linkage between a transversal and the corresponding lateral rod comprises a first pair of rollers mounted upon the arm and rotatable around axles parallel to the suspension axis of the secondary part, placed respectively on each side of the lateral rod and at two different levels, the upper roller resting upon the inner side of the rod and the lower roller upon the outer side of the rod, each roller being solid with a free-wheel or other equivalent means allowing its rotation only in the direction permitting to the arm to slide towards the lower part of the rod, so that, in the case when the action of the cross-bar tends to lift the arm, both rollers pushed respectively upon each side of the rod are locked in rotation and, thanks to their friction upon the rod, make the arm solid with said rod and put in action the rotation-multiplying system.

In such case, the linkage of the cross-bar with the parallelogram is realized, according to the direction of inclination of the vehicle by the arm which tends to slide towards the higher part of its rod, both arms resting respectively, in the opposite direction, upon two elastic supports solid with primary part.

But it is also possible to use both arms to control the rotation-multiplying system, each sliding linkage comprising then a second pair of rollers placed respectively at the other level and on the opposite side in respect to the rollers of the first pair, each roller being solid with a freewheel allowing the rotation of the second pair in the direction where the arm is lifted along the corresponding rod and locking that rotation in the opposite direction so as to make solid, in that case, the arm with the rod.

In a still more perfectionate embodiment, each transversal arm is fitted with a servo-mechanism controlling a movement of the arm along the rod, allowing to the primary part to follow an inclination given by the driver to the secondary part. In that aim, the servo-mechanism comprises two pinions born respectively by both transversal arms and mating respectively with a rack solid with the corresponding lateral rod, each of them mounted upon a shaft perpendicular to the rod and able to be made solid in rotation through a clutch with another shaft in permanent rotation, thanks to a motor, in the direction inducing the movement of each pinion towards the lower part of the corresponding rack, the servomechanism comprising also a lever controlling one or the other clutch, said lever being suspended to a piece which follows the inclination movements of the primary part and controled by another piece following the inclination movements of the secondary part, so as to control one or the other clutch when the inclination of the secondary part is higher than the inclination of the primary part towards the same side.

Other improvements could be brought to the invention, but that invention will be clearly understood through the detailed description of several embodiments, with reference to the annexed drawings.

DETAILED DESCRIPTION OF PREFERRED EMBODIMENTS

It must be at first emphasized that on the Figures, the constituting pieces are schematically shown in a manner allowing to understand clearly the working mode, the real features being easily chosen in relation with the needs.

Figure 1:
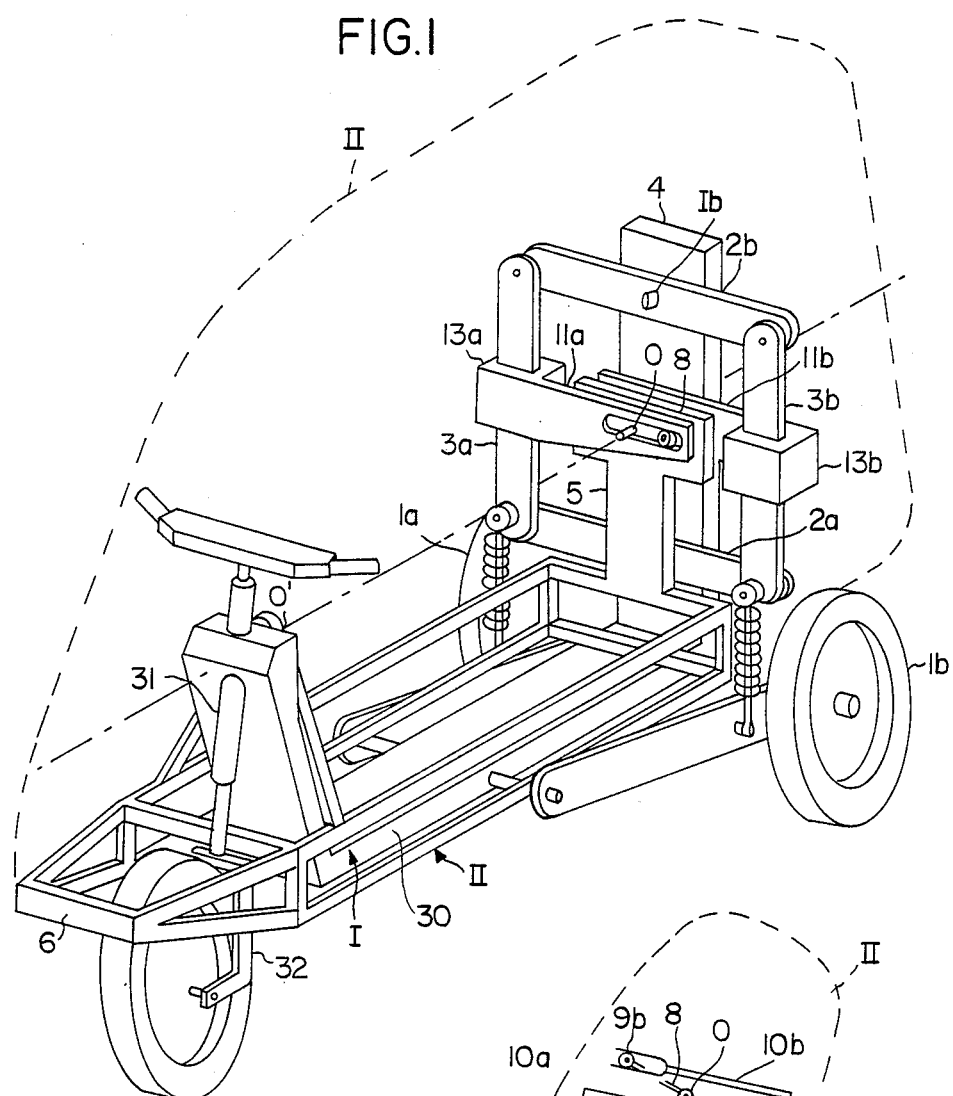
FIG. 1 is a perspective schematic drawing of an inclinable three-wheel vehicle.

On FIG. 1 is schematically shown a three-wheel vehicle according to the invention, comprising a primary part I, constituted of a chassis 30 resting upon the ground through three wheels and at which is suspended a secondary part II.

Chassis 30 bears on its fore part a steering column 31 which bears the steering fork 32 and rests upon the ground through the steering forewheel. In the rear part, a structural mast 4 rests upon both wheels 1a and 1b constituting the rear wheelset through an articulated parallelogram which comprises two lateral vertical rods 3a, 3b parallel between them and to the structural mast 4, that is to say to the median plane of the primary part passing by the axis of the steering column and the center of the rear wheelset, both said lateral rods 3a, 3b being hinged at their ends with two equalizers 2a, 2b, articulated upon the structure mast 4 around axles placed one upon the other in the vertical median plane of the primary part and parallel to the ground.

Both wheels 1a and 1b are linked to the lateral rods 3a, 3b, either directly or, as shown on the Figure, through suspension arms or other devices allowing a movement of the wheels in relation with the rods but maintaining the axles of both wheels perpendicular to the median plane and consequently to the lateral rods.

The secondary part II is a body mounted upon a frame 6 which is suspended to the primary part so as to allow it to rotate in relation with said primary part around a suspension axis 00' parallel to the ground and through which pass both median planes of primary part I and secondary part II.

The rotation-multiplying system is operated by a cross-bar 8 solid in rotation with the secondary part around the suspension axis 00'. In the example shown on FIG. 1, cross-bar 8 is centered upon axis 00' and extends symetrically on each side of that axis, and is linked to frame 6 of the secondary part by an arm 5 so that any rotation of the secondary part around the suspension axis 00' induces a rotation by the same angle for cross-bar 8 and reciprocally.

The principle of the rotation-multiplying system described in the previous French Pat. No. 2.600.612 is shown schematically on FIG. 2.

On that Figure it has been drawn with single lines the primary part comprising both wheels 1a, 1b of the rear wheelset and the deformable parallelogram comprising both equalizers 2a, 2b and both lateral rods 3a, 3b, those elements constituting a parallelogram articulated on the central mast 4 which bears the axle 0 of suspension for the secondary part. The said secondary part comprises a suspension arm 5 solid with cross-bar 8 which passes, in the shown example, through the suspension axis 0.

At each end of cross-bar 8 are mounted two rollers 9a, 9b which move in guides born by arms 10a, 10b mounted upon both rods 3a, 3b so as to extend as consoles towards the inner part perpendicularly to said rods and trespassing the suspension axis 0 so that roller 9a at the end of cross-bar 8 on the right on the Figure slides in the guide placed at the end of arm 10a solid with lateral rod 3a on the left of the Figure.

Thanks to that feature, one may see that the length of rods 3a and 3b and of mast 4 being identical, when the articulated parallelogram becomes a rectangle, suspension arm 5 and mast 4 are in the same median plane. That is the case when the vehicle is at standstill upon an horizontal ground. If then the primary part, that is to say mast 4, inclines by an angle A in relation with the vertical, arm 5 rotates by an angle B>A; the dimensions of the arms, of the equalizers and of the cross-bar are chosen so that, taking into account the masses and the respective positions of the centres of gravity of the primary part and of the secondary part, the centre of gravity of the whole of the vehicle is moved further from the ground in such a movement; the stability of the vehicle is therefore secured, as such a movement could not occur without a supply of energy to allow the lifting of the centre of gravity.

However that device, as said also in the overcited patent, affords a certain number of inconveniences:

it tends to oppose to inclination of the vehicle in a curve, that inclination being necessary to balance the centrifugal force, it works correctly only when the vehicle rests upon an horizontal ground.

The overcited French patent provides therefore the possibility for the linkage between primary part and secondary part to be under the control of a clutching system and, in said patent, is described a clutching system disposed between suspension arm 5 and cross-bar 8 at the level of axis 0, the clutching being effective only when the median plane of the body or secondary part is discarded from the direction of the apparent vertical in the direction of the fall of the vehicle. Moreover, a system controlled by a centrifugal device makes solid together the primary and secondary parts when the speed grows, so as to make uneffective, with total certainty, the locking device.

The present invention allows a simplification of the prior art and a decrease of the locking time, thanks to the continuity of the linkage between primary part and rotationmultiplying system, that linkage being not realized any more upon the suspension axis by a clutching system between body and cross-bar, but at the level of the link between the transversal arms and the lateral rods, the cross-bar remaining always solid with the body or secondary part.

Figure 3:
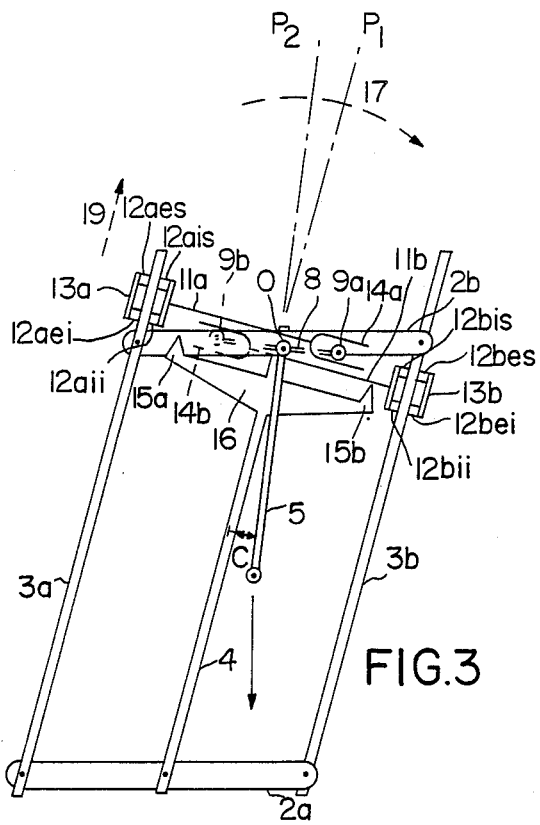
FIG. 3 is a schematic diagram of a system comprising a deformable parallelogram fitted with a locking device accordingly to the invention, in a first embodiment.

Such a system according to the invention is shown schematically on FIG. 3.

Figure 2:
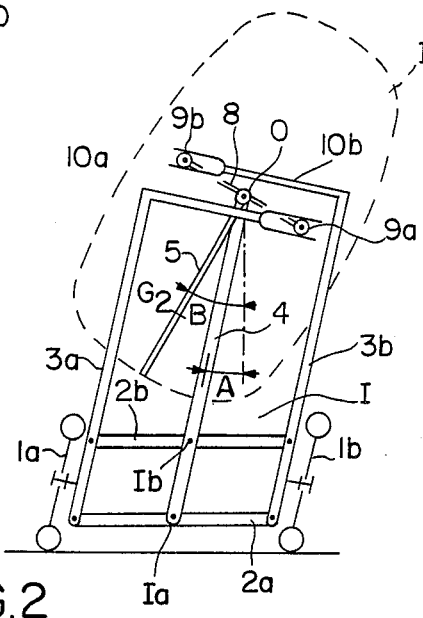
FIG. 2 is a schematic diagram of the working principle of the previously known device.

As represented on that Figure, het transversal arms referenced as 10a, 10b on FIG. 2, which were fixed rigidly to rods 3a, 3b, are replaced by sliding consoles 11a, 11b which, when not loaded by rollers 9a, 9b, may slide freely along rods 3a, 3b when the articulated parallelogram is deformed by inclination of the vehicle or ground irregularity.

Each sliding arm or console as 11a is therefore constituted by the transversal arm 10a as previously described and provided at its inner end with the guide 14a in which moves roller 9a, that arm being provided at its outer end sliding upon lateral rod 3a, with a sliding-block 13a provided itself with friction shoes disposed in two pairs placed on each side of rod 3a but at two different levels. So is it possible to distinguish the outer shoes, respectively upper shoe 12aes and lower shoe 12aei, and the inner shoes, respectively upper shoe 12ais and lower shoe 12aii.

On FIG. 3 is also drawn schematically median plane P1 of primary part, passing through the axis of both equalizers 2a, 2b of the deformable parallelogram, and median plane P2 of the secondary part passing through the suspension axis 00' of said secondary part and in which is located the centre of gravity of the secondary part G2. Both planes P1 and P2 intersect along suspension axis 00'.

Both consoles or sliding transversal arms 11a, 11b rest respectively, when idle, upon two elastic supports 15a, 15b symetrically disposed on each side of plane P1, upon a steady support 16 solid with mast 4 of primary part. In that balanced position, both arms 11a, 11b are in line with crossbar 8.

That balanced position corresponds to the coincidence of both median planes P1 of the primary part and P2 of the secondary part and is realized, not only at standstill or on straight line, when both planes P1 and P2 are vertical, but also on curves when both planes are inclined by the same angle in relation to the ground and coincide with the apparent vertical, i. e. the resultant of gravity and centrifugal force, a direction which is followed naturally by the median plane of the secondary part if it is free to rotate around the suspension axis.

As far as median planes P1 and P2 stay in line, for instance under driver's action, with the apparent gravity, both arms 11a and 11b also remain in line with cross-bar 8, they are submitted to no other force than apparent gravity and rest upon supports 15a, 15b. So when both planes P1 and P2 follow the same inclination as the apparent vertical, that inclination induces a corresponding movement of slideblocks 13a, 13b along the lateral rods 3a, 3b. For instance, if the vehicle must incline towards the right like on FIG. 3, slide-block 13a moves upwards along rod 3a, so as to maintain arm 11a perpendicular to said rod 3a, when slide-block 13b moves downwards by the same distance along rod 3b.

But, if median plane P1 of primary part is not inclined according to the apparent vertical or if the vehicle being at standstill upon an horizontal plane tends to fall, for instance towards the right in the direction of arrow 17, making with the vertical an angle A, the weight of the secondary part applied in G2 upon the suspension arm 5 solid with cross-bar 8 induces the opening of an angle C with mast 4, and both rollers push respectively upwards and downwards upon the respective ends of the corresponding arms 11a, 11b which are so submitted to a rotation torque, inducing the compression of the friction shoes shown in black on the figure, that is to say, for arm 11a which tends to slide upwards, outer lower shoe 12aei and inner upper shoe 12ais, and for arm 11b which tends to slide downwards, outer upper shoe 12bes and inner lower shoe 12bii.

That movement has for first consequence, thanks to the friction of shoes 12ais, 12aei, 12bis, 12bii, to lock arms 11a, 11b, through their slide-blocks 13a, 13b upon the lateral rods 3a, 3b. Would in such conditions the fall tend to go on, crossbar 8 would turn in the direction of arrows 17, pulling in the same direction the centre of gravity G2 which would quickly move upwards, taking into account the speed multiplying ratio between the rotation of the rod and that of the crossbar. The lifting of G2 would then induce that of the centre of gravity of the whole of the vehicle, what is obviously impossible without an external supply of energy. It would then appear upon primary part a return torque due to secondary part, tending to set up the primary part so as to reset it in the direction of the vertical if at standstill or in the direction of the apparent vertical if rolling.

Figure 4:
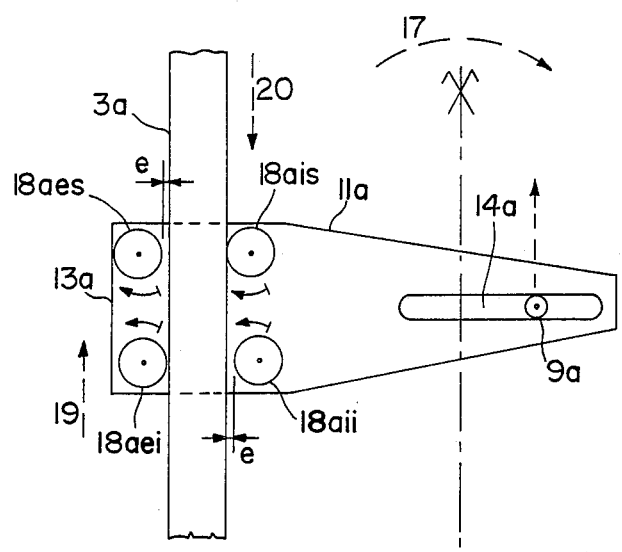
FIG. 4 is a partial schematic view illustrating a second type of locking for a transversal arm.

It can be seen that the precedently described device is simple but, when the vehicle is rolling, it would not allow the driver to anticipate on the centrifugal force to begin the inclination at the entry of the curve. It is why, in a still improved embodiment shown on FIG. 4, the friction shoes of slide-blocks 13a, 13b are substituted by freewheels or other devices realizing the locking in one direction only.

Figure 5:
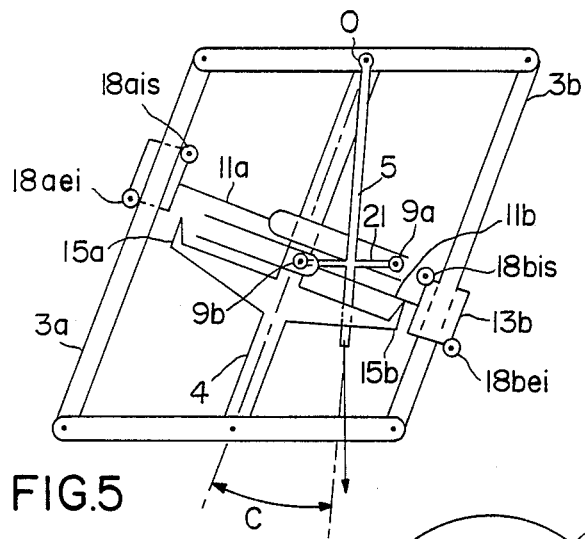
FIG. 5 is a working scheme for another type of embodiment.

FIG. 5 is a partial schematic view showing only sliding arm 11a associated to left lateral rod 3a. It may be seen that, in that case, slide-block 13a is constituted of four rollers placed at different levels on each side of rod 3a, respectively a pair of outer rollers 18aei, 18aes and a pair of inner rollers 18aii and 18ais.

In case of an inclination of plane P1 not corresponding with the apparent vertical, if roller 9a pushes upwards upon the end of arm 11a, that force creates a torque opposite to arrow 17 of figure and arm 11a bears upon rod 3a through two rollers 18ais and 18aei, when the two other rollers 18aes and 18aii are at a light distance or play e from the rod.

Each roller is associated with a freewheel permitting rotation in only one direction shown on the figure by an arrow of which the head shows the direction in which it may turn and the bottom the direction in which it is locked. When arm 11a is not pushed by any force from roller 9a, the four rollers 18 work as a slide-block allowing the movements of arm 11a along the lateral rod 3a. But, if roller 9a pushes upwards, both rollers 18aei and 18ais applied to lateral rod 3a with their rotation impeded by the freewheels in the direction of an upward movement, impede such a movement which would induce the fall of the vehicle but, reciprocally, authorize any reverse movement, that is to say downwards, which induces a set up of the vehicle.

So, leaving a vertical balance position, an inclination movement of the driver, for instance towards the right when looking in the direction of travel, moves the center of gravity of the secondary part to the right and consequently moves the lower part of said secondary part to the left to maintain the centre of gravity in the plane of the suspension axis. This movement has for result to authorize inclination to the right and to lock inclination to the left, what is aimed at when the vehicle enters a curve to the right.

It may also be noticed that this movement of the secondary part is also naturally obtained by the action of the centrifugal force (or of a lateral wind), which locks the inclination of the vehicle outwards (or to leeward), and on the contrary authorizes it, and even makes it easier, inwards (or to windward), by creating an inclination torque.

In the embodiment shown on FIG. 3, the cross-bar 8 is centered on the suspension axis 00'. One may consider that such an arrangement affords the inconvenience of concentrating several elements in the upper part of the articulated parallelogram; however, the cross-bar 8 may give its rotation-multiplying effect even if it does not pass by the suspension axis 00'. As an example, FIG. 5 shows schematically an arrangement in which cross-bar 8 is under the suspension axis.

On same figure, it may be seen that rollers 9a, 9b are secured to a little cross-bar 21 solid with secondary part in level and rotation. The movement of the rollers is slightly different of the previous case, in that way that, for instance on FIG. 5, in a rotation C, roller 9a is a little more lifted than roller 9b is lowered, and consequently the "lifted" arm 11a will be pushed up before the lowered arm 11b be pushed down. It appears that one only of both arms is then used for locking, and it may be kept only two freewheels (18ais and 18aei, 18bis and 18bei) on each arm. Moreover, the lifted arm tends to leave its support 15a, what allows to simplify it and suppresses its action which could be unadapted when the arm is lowered and bears on the support, which decreases its action.

It has been seen that any movement of the centre of gravity G2 of the secondary part or body induces for the vehicle a possibility of inclination on the side of the movement, a locking on the other side. Therefore, if the driver leans to the right, the vehicle may incline to the right, what is in conformity with the natural behaviour of the driver. When the driver stops his vehicle without any intention to leave it, he remains in a vertical position and also the vehicle. But, if he wants to leave the vehicle, he runs the risk to put his weight at least partly upon one side of the secondary part, and the vehicle will tend to incline that side until the centre of gravity of the secondary part will pass at the vertical of the suspension axis 00'. Then in such a stop, it is compulsory for the vehicle to be completely locked, for instance simultaneously with a tightening of the handbrake.

That result can easily be obtained by giving to cross-bar 21 of FIG. 5, which bears rollers 9a, 9b, the possibility to be pulled upwards, for instance by sliding on suspension arm 5 or lifting said arm, what has for effect to block both sliding arms 11a and 11b and to impede any change in the shape of the deformable parallelogram. Simultaneously, suspension arm 5 will be locked in middle position by a cog so as to avoid it to rest permanently upon the arms. Those devices are simple and well known and it does not appear necessary to show them.

Of course, the invention is not limited to the embodiments which have been described and could be improved or modified, specially by the use of equivalent means.

For instance, the freewheels associated to rollers 18 to control the locking of the sliding arms upon the lateral rods could be substituted by equivalent devices such as bars.

However, in a more improved embodiment, it may be associated to the rotation-multiplying system a control servo-mechanism working upon the movement of the sliding arms under the action of the apparent gravity. Such a servomechanism is shown as an exemple on FIG. 6. In that case, the sliding arm 11a which, like previously, bears upon the sides of the lateral rods 3a through rollers 18aei, 18ais associated to freewheels, is also provided with a pinion 41a mating with a rack 40a solid with lateral rod 3a.

Figure 6:
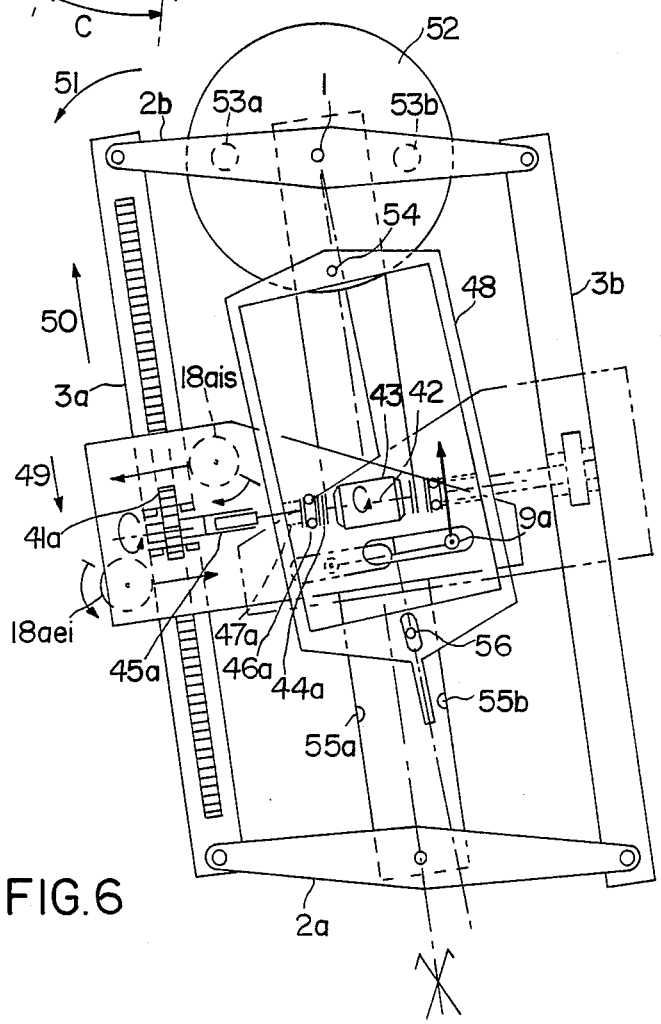
FIG. 6 is a schematic view of a more improved embodiment comprising a servo-mechanism.

On FIG. 6, it has also been shown roller 9a born, like in the arrangement of FIG. 5, by a cross-bar 21 solid with the secondary part, said cross-bar working to realize the stabilization by the rotation-multiplying effect. Pinion 41a is solid with a shaft which can be made solid in rotation, thanks to a sliding sleeve 45a and a clutch 44a, with another shaft 42 driven in permanent rotation in a constant direction, either by an independant motor 43, or by the motor of the vehicle through any adequate mechanism, said shaft 42 and motor 43 being born steadily by structural mast 4 of the primary part.

Clutch 44a is controlled by a thrust ball-bearing 46a pushed by a spring 47a, said spring itself being pushed by an auxiliary frame-shaped lever 48, articulated in 54 upon mast 4 and moved by a cog 56 fixed to arm 5 solid with the secondary part II.

When the secondary part II is pushed to the right, as shown on FIG. 6, by the centrifugal force or by the horizontal component of the gravity at standstill, cog 56 solid with arm 5 is discarded to the right and pushes frame 48 which engages clutch 44a. Pinion 41a is then driven by the motor, the rotating direction of which is such as to induce relative movement of arm 11a downwards along lateral rod 3a in the direction of arrow 49, and consequently relative movement of rod 3a upwards in the direction of arrow 50. This movement is authorized by freewheels 18aei, 18ais and has for consequence, taking a support on the wheels, to make the whole of the vehicle rotate in the direction of arrow 51, that is to say inwards in relation with the curve of the trajectory (in the case of centrifugal force), or towards the vertical (in the case of gravity), the median plane P1 of the primary part coming to coincide with the median plane P2 of the secondary part.

Such a movement tends obviously to create in the secondary part inertia forces opposed to the movement, that is to say having the same direction as the centrifugal force, and it may be necessary to use a "feed-back" to avoid any swinging effect. According to another improvement of the invention, such a feed-back effect is obtained thanks to the movement of equalizer 2b, the direction of which is opposed to that of secondary arm 5. In that aim, the suspension axis 54 of frame 48 is placed, not directly upon mast 4, but on a disc 52 born by axle 0 and submitted to the action of two shoes 53a, 53b which bear upon it with dry or viscous friction and are solid with equalizer 2b: the rotation of equalizer 2b tends therefore to decrease the action of frame 48. Shoes 53a and 53b may also be constituted of magnets. Nevertherless, it could be sufficient to limit the movements of the secondary part through cogs 55a, 55b to limit or even to avoid inertia effects.

What I claim is:

1. A stabilization device for an inclinable vehicle comprising:
   a primary part (I) resting upon the ground through at least three wheels, respectively a steering forewheel and two rear wheels,
   a secondary part (II) mounted on primary part (I) rotatably around a suspension axis (00') parallel to the ground and situated in the median plane (P1) of primary part,
   an inclination system with a deformable parallelogram allowing the inclination of primary part (I) and of the wheels in relation with the ground, comprising two lateral vertical rods (3a, 3b) parallel to the median plane and hinged at their ends with two parallel equalizers articulated upon primary part (I), respectively around two axles (Ia, Ib) placed one over the other in the median plane (P1) and parallel to the ground, the axles of both wheels (1a, 1b) being mounted respectively on both lateral rods (3a, 3b) perpendicular to median plane P1,
   a rotation multiplying system comprising a cross-bar (8) solid in rotation with secondary part (II), which extends transversely on each side of the median plane (P2) of said secondary part, and two transverse sliding arms or consoles (11a 11b), mounted respectively on both lateral rods (3a, 3b) of the parallelogram transversely to said rods and weighing respectively upon the end of the cross-bar 8 opposed to corresponding lateral rod (3a, 3b), wherein arm (11a, 11b) is linked to the corresponding lateral rod (3a, 3b) through a sliding linkage (13a, 13b) allowing movement of arm (11a, 11b) along lateral rod (3a, 3b) remaing perpendicular to said rod,
   said linkage (13a, 13b) comprising means (12, 18) for selective control of locking and unlocking of the arm, taking into account the relative angles between median planes (P1, P2) of both primary part (I) and secondary part (II) in relation with te direction of the apparent vertical, that is to say the resultant of gravity force and centrifugal force.

2. A stabilization device according to claim 1, wherein the sliding linkage (13a, 13b) between each transversal sliding arm or console (11a, 11b) and the corresponding lateral rod (3a, 3b) comprises four shoes (12) disposed in two pairs on each side, respectively the inner side and the outer side of the rod (3a, 3b) and at two different levels, respectively upper level and lower level, each lateral rod (3a, 3b) being allowed to slide with low friction between corresponding shoes (12) when both arms (11a, 11b) are in line in middle position with cross-bar (8) and, when at least one of both arms (11a, 11b) is dicarded from its middle position in relation with cross-bar (8) because a movement of the centre of gravity (G2) of secondary part (II) in relation with median plane (P1) of the primary part (I), this movement of arm (11a, 11b) induces the application upon corresponding rod (3a, 3b) of two of the shoes (12) placed respectively on the opposite sides of said rod and at different levels, and through friction makes the lateral rod (3a, 3b) solid with the corresponding arm (11a, 11b).

3. A stabilization device according to claim 1 or 2 wherein each sliding linkage (13a, 13b) between an arm (11) and the corresponding lateral rod (3) comprises a first pair of rollers (18ais, 18aei, 18bis 18bei) mounted rotatable around axles parallel to the axis of suspension (00') and placed respectively on each side of the lateral rod and at two levels, the upper roller (18ais) bearing upon the inner side of the lateral rod (3) and the lower roller (18aei) upon the outer side, each roller being associated with a freewheel or other equivalent means authorizing its rotation only in the direction corresponding to a downwards movement of arm (11) towards the lower part of the rod (3) so that, when crossbar (8) tends to move arm (11) upwards, both rollers applied respectively upon both sides of the lateral rod (3) are blocked in rotation and make arm (11) solid with lateral rod (3) and induce the action of the rotation-multiplying system.

4. A stabilization device according to claim 3, wherein each sliding linkage (13a, 13b) comprises a second pair of rollers (18aes, 18aii), (18bes, 18bii) placed respectively at the other level and on the opposite side in relation with the first pair of rollers, each of them being associated with a freewheel allowing rotation of the rollers of said second pair in the direction where arm (11) slides upwards along corresponding lateral rod (3) and blocking rotation downwards so as in that case to make arm (11) solid with rod (3).

5. A stabilization device according to claim 1, 2, 3 or 4, wherein each arm (11a), (11b) is associated with a servomechanism (41,42,43,44,48) which controls downward movement of corresponding lateral rod (3a, 3b) and allowing the primary part (I) to follow an inclination given by the driver to the secondary part (II), said servo-mechanism comprising two pinions (41a, 41b), born respectively by both arms (11a, 11b), each pinion mating with a rack (40a, 40b) provided along corresponding lateral rod (3a, 3b) and being mounted upon a shaft perpendicular to lateral rod (3a, 3b) which can be made solid in rotation, by the means of a clutch (44a, 44b) with a shaft 42 driven in permanent rotation by a motor (43) in the direction allowing the movement of each pinion (41a, 41b) downwards along corresponding rack (40a, 40b), said servo-mechanism comprising also a lever (48) controlling one or the other of clutches (44a, 44b) and articulated around a suspension axis (54) upon a rotating piece (52) following the inclination movements of primary part (I) in relation with the ground and controlled by a cog (56) according to the inclination movements of secondary part (II), to control one or the other clutch (44a, 44b) when the inclination of secondary part (II) towards corresponding lateral rod (3a, 3b) is higher than the inclination of primary part (I) towards the same side.

6. A stabilization device according to claim 5, wherein said rotating piece (52) following the inclination of the primary part (I) is a disc (52) centered upon primary part (I) around suspension axis (00') and bearing, at a lower level, the axle (54) upon which control lever (48) is articulated, said disc (52) being driven in rotation by the upper equalizer (2b) of the parallelogram through the shoes (53a, 53b) by dry or viscous friction.

* * * * *